US011930954B2

(12) United States Patent
Sun

(10) Patent No.: US 11,930,954 B2
(45) Date of Patent: Mar. 19, 2024

(54) PRESS TOOL

(71) Applicant: Lung Cheung Lionel Sun, Hong Kong (CN)

(72) Inventor: Lung Cheung Lionel Sun, Hong Kong (CN)

(*) Notice: Subject to any disclaimer, the term of this patent is extended or adjusted under 35 U.S.C. 154(b) by 764 days.

(21) Appl. No.: 17/271,355

(22) PCT Filed: May 28, 2019

(86) PCT No.: PCT/CN2019/088790
§ 371 (c)(1),
(2) Date: Feb. 25, 2021

(87) PCT Pub. No.: WO2019/228343
PCT Pub. Date: Dec. 5, 2019

(65) Prior Publication Data
US 2021/0244227 A1 Aug. 12, 2021

(30) Foreign Application Priority Data

May 28, 2018 (CN) .......................... 201820801716.5

(51) Int. Cl.
*A47J 19/06* (2006.01)
*B30B 9/06* (2006.01)

(52) U.S. Cl.
CPC ................ *A47J 19/06* (2013.01); *B30B 9/06* (2013.01)

(58) Field of Classification Search
CPC .... B30B 9/02; B30B 9/04; B30B 9/06; B30B 15/08; A23N 1/00; A23N 1/02; A23L 2/04
USPC ................ 100/110, 112, 125, 213, 234, 243; 99/495, 505, 506, 508, 501, 503, 513, 99/565
See application file for complete search history.

(56) References Cited

U.S. PATENT DOCUMENTS

| | | | |
|---|---|---|---|
| 980,466 A * | 1/1911 | Williams | A47J 19/022 100/234 |
| 3,036,610 A * | 5/1962 | Goodloe | A47G 19/28 D7/696 |
| 4,794,854 A | 1/1989 | Swaim | |
| 8,534,190 B2 * | 9/2013 | Ericsson | A47J 19/06 99/506 |

(Continued)

FOREIGN PATENT DOCUMENTS

| | | |
|---|---|---|
| CN | 1496700 A | 5/2004 |
| CN | 201542390 U | 8/2010 |

(Continued)

OTHER PUBLICATIONS

International Search Report for PCT Serial No. PCT/CN2019/088790 dated Sep. 3, 2019.

*Primary Examiner* — Jimmy T Nguyen

(74) *Attorney, Agent, or Firm* — McCormick, Paulding & Huber PLLC

(57) ABSTRACT

An opening and closing handheld kitchen press tool includes a cup body formed from a right half cup body hingedly coupled to a left half cup body, a fixed handle having first and second ends, a pin seat coupled above an upper shaft seat of the right half cup body, a moveable handle connected into the pin seat to allow the moveable handle to be raised and lowered relative to the fixed handle, and a hanging hammer extending below the moveable handle on a hammer frame that is pivotally coupled to the moveable handle at a hammer connection.

20 Claims, 5 Drawing Sheets

(56) References Cited

U.S. PATENT DOCUMENTS

2002/0046658 A1\* 4/2002 Kokkinos ............... A47J 19/06
  99/349
2017/0202387 A1 7/2017 Cheng

FOREIGN PATENT DOCUMENTS

| CN | 102348399 A | 2/2012 |
| CN | 204635940 U | 9/2015 |
| CN | 206434163 U | 8/2017 |
| WO | 2012121743 A1 | 9/2012 |

\* cited by examiner

PRESS TOOL

CROSS REFERENCE TO RELATED APPLICATIONS

This application is a National Stage application of International Patent Application No. PCT/CN2019/088790, filed on May 28, 2019, which claims priority to Chinese Patent Application No. 201820801716.5 filed on May 28, 2018, each of which is hereby incorporated by reference in its entirety.

TECHNICAL FIELD

The invention relates to the field of kitchen equipment and, in particular, to side-opening (and closing) tools such as garlic presses and other kitchen implements used to prepare (e.g. press or dice) foodstuffs such as onions, ginger, shallots or other fruit or vegetable and general foodstuffs having a relatively hard composition or texture.

BACKGROUND

Currently, hand-pressure type garlic presses are the most common form of garlic press. However, with use, they experience some drawbacks associated with the nature by which pressure is applied in operation. For example, their shape can be distorted. Also, after a garlic bulb is loaded into a cup of the press and then pressed, residue parts of the pressed garlic embed and/or adhere themselves into the holes and surfaces of the press. This means that the garlic press is not easy to clean.

U.S. Pat. No. 4,794,854 is a side-opening garlic press that has a cutting base formed by two mating halves. These two halves align and marry up to each other along a wave-like interface to form a two-part bottom extrusion/cutting plate. The halves are held together by a closing force generated on arms that extend from the bowl of the garlic press.

SUMMARY

The present invention provides a quick-opening garlic press that is easy to clean and which, consequently, addresses at least some of the above-mentioned deficiencies of the prior art.

In accordance with a first aspect of the present invention there is provided an opening and closing handheld kitchen press tool comprising:
  a cup body formed from a right half cup body hingedly coupled to a left half cup body, wherein each of the right half cup body and the left half cup body has an inner surface and an outer sidewall, and
  the left cup body includes:
    at a hinge side thereof, a vertical shaft,
    along a lower edge of the inner surface, a cup bottom plate laterally extending from the lower edge, wherein the cup bottom plate includes a plurality of extrusion apertures, and
    a latch in the form of a lift handle and block, wherein the latch is coupled to the outer sidewall at an open side of the left cup body in an upper corner,
  the right half cup body includes a laterally-extending bracket extending from a lower edge thereof and, from a hinge side and extending from the outer sidewall, a lower shaft seat correspondingly vertically aligned with an upper shaft seat,
  a fixed handle having first and second ends, the first end connected to the outer surface of the right half cup body opposite the vertical shaft, the fixed handle including an upwardly extending and sideways projecting hook at the first end,
  a pin shaft seat coupled above the upper shaft seat of the right half cup body,
  a moveable handle connected into the pin shaft seat to allow the moveable handle to be raised and lowered relative to the fixed handle, and
  a hanging hammer extending below the moveable handle on a hammer frame that is pivotally coupled to the moveable handle at a hammer connection, the hanging hammer further including a hammer seat located at a remote end of the hammer frame, wherein pivoting coupling of the hammer frame to the moveable handle allows the hammer seat to drop vertically within the cup body when the cup body is formed from closure together of the left half cup body against the right half cup body, and
to form the cup body:
  a pin holds the vertical shaft in place between the lower shaft seat and the upper shaft seat and allows rotation of the vertical shaft and the cup bottom plate about the pin and the vertical shaft is vertically moveable between the lower shaft seat and the upper shaft seat along the pin, and
  when the kitchen press tool is in the closed position, the cup bottom plate rests against the bracket to overlap the bracket thereby to provide a floor that extends generally between the inner surfaces of the hingedly closed right half cup body and left half cup body, and
  closing of the kitchen press tool requires, initially, the left half cup body to be raised vertically towards the upper shaft seat to permit the cup bottom plate to clear the bracket and for the block to pass over the upwardly extending and sideways projecting hook, whereafter secure closing of the left half cup body to the right half cup body occurs with snap connection of the block as it drops and is retained from lateral movement by the hook.

The upper end apertures of the plurality of extrusion apertures in an upper surface of the cup bottom plate are preferably larger than lower end apertures in a bottom surface of the cup bottom plate.

An under surface of the hammer may be provided with a plurality of protruding teeth adapted to locate into the apertures in the cup bottom plate.

In one embodiment, the upper end apertures are of a hexagonal prism shape and the lower end apertures are of a cylindrical shape.

The distance between upper end apertures is about 3 mm. Thicknesses of the cup bottom plate and aperture separation can, however, vary and selection is a function of desired structural strength.

Each of the extrusion apertures may be conical in configuration.

Embodiments of the invention allow for the entire garlic cutting plate to be accessed from the press/tool to facilitate cleaning of both (i) the internal surfaces of the formed cup body and (ii) the cutting apertures of the cup's bottom plate. This integral construction eliminates the risk of part loss, while the arrangement of components reduces the likelihood of part failure, such as from buckling from wall or grating distortion.

In a second aspect of the invention there is provided an opening and closing garlic press comprises a cup body, a movable handle and a hanging hammer, wherein the cup body comprises a right half cup body, a left half cup body and a cup bottom plate, the outer side wall of the fixed end of the right half cup body is provided with a vertically corresponding upper shaft seat and a lower shaft seat, and the fixed end outer side wall of the left half cup body is provided with a rotating shaft, the rotating shaft, the upper shaft seat and the lower shaft seat are connected by a rotating shaft; the upper end of the movable end of the right half cup body is connected by a snap connection with the upper end of the movable end of the left half cup body; a lower end of the inner wall of the right half cup body is provided with a bracket, and one end of the cup bottom plate and the bracket is overlapped, and the other end of the cup bottom plate is fixedly connected with the bottom end of the inner wall of the left half cup body, and the cup bottom plate is provided with garlic holes; the upper end of the fixed end of the right half cup body is provided with a pin seat, and the movable handle is connected with the pin seat through a pin; the movable handle provided with a hammer connecting frame, a hanging hammer comprises a hammer frame and a hammer seat, and the hammer frame and the hammer connecting frame are connected by a pin shaft; the movable handle is provided with a hammer connecting frame, the hanging hammer comprises an integrally connected hammer frame and a hammer seat, and the hammer frame and the hammer connecting frame are connected by a pin shaft;

One end of a fixed handle is fixedly connected to the movable end of the right half cup.

Upper end apertures of the garlic hole may be larger than the lower end aperture.

In an embodiment, a lower end surface of the hammer seat is provided with protruding teeth, and the protruding teeth have shape corresponding to upper end apertures of the garlic hole (which amounts to an extrusion aperture)

In one particular embodiment, the upper end aperture of each garlic hole has a hexagonal prism shape and the lower end aperture has a cylindrical shape.

The beneficial effects produced by the above technical solutions include:
(1) The side-opening and split-configuration of the cup (produced by contacting of the left half cup body to the right half cup body) facilitates the cleaning of the holes of the garlic press and the cup bottom plate;
(2) The spacing between adjacent garlic holes in the press plate is about 3 mm, or less than 3 mm, with the interstitial material between holes allowing the formation of a sharp edge. The upper end aperture of the garlic hole has a larger diameter than the lower end aperture, and the two structures are more likely to cut and squeeze the garlic;
(3) The hammer seat is provided with downwardly-projecting protruding teeth that are adapted to cooperate with the aperture of the garlic holes, with this structural arrangement fully cutting and squeezing the garlic as it is pressed between the hammer seat and the cup bottom plate.

Returning to the arrangement and retention of the cup bottom plate, i.e. the garlic cutter as defined by its apertures, besides being formed in and laterally extending from the lower edge of the left [half] cup body, the cup bottom plate [when the opening and closing garlic press is assembled] rests on laterally-extending bracket formed along a lower edge of the right [half] cup body. By resting the cup bottom plate on the supporting lower edge (or "ledge"), the configuration of the preferred embodiment ensures that the cup bottom plate is not subject to twisting or lateral buckling forces that would otherwise arise when a lateral closure pressure is applied to close—and keep closed—the assembled garlic press. In the configuration as claimed, there are no lateral forces applied to the cup bottom plate.

The configuration of the garlic press of the various aspects and embodiments advantageously avoids vertical misalignment between its two, with the snap lock defining walls of a cup body that generally are not subject to lateral stresses or lateral closure forces.

In adopting the configuration as described herein and shown in the accompanying drawings, any pressure is also distributed through a force path made up from the integrally formed hook, which is part of the handle. The fact that the preferred embodiment also has a vertically-engaging latch feature also results in the effect that the body cup does not easily become disengaged. And there is also a lower force required to operate the press from the perspective of the user, i.e. the user simply needs to press the hammer down using the moveable handle, and they do not need to worry about keeping the two halves of the garlic press closed tightly together with additional lateral hand pressure/squeezing. Forming and defining a cup body without having continuously to provide lateral closure forces also reduces the possibility for the hammer's descent to be influenced by the internal sides of the formed cup body. The hook and latch arrangement provides a more secure and better locking mechanism that avoids inappropriate and unwanted forces within the improved garlic press and, furthermore, the configuration provides a structure that facilities cleaning of the cutting holes and internal surfaces of the half-cups.

BRIEF DESCRIPTION OF THE DRAWINGS

Exemplary embodiments of the present invention will now be described with reference to the accompanying drawings, in which.

DETAILED DESCRIPTION

Figure 1:
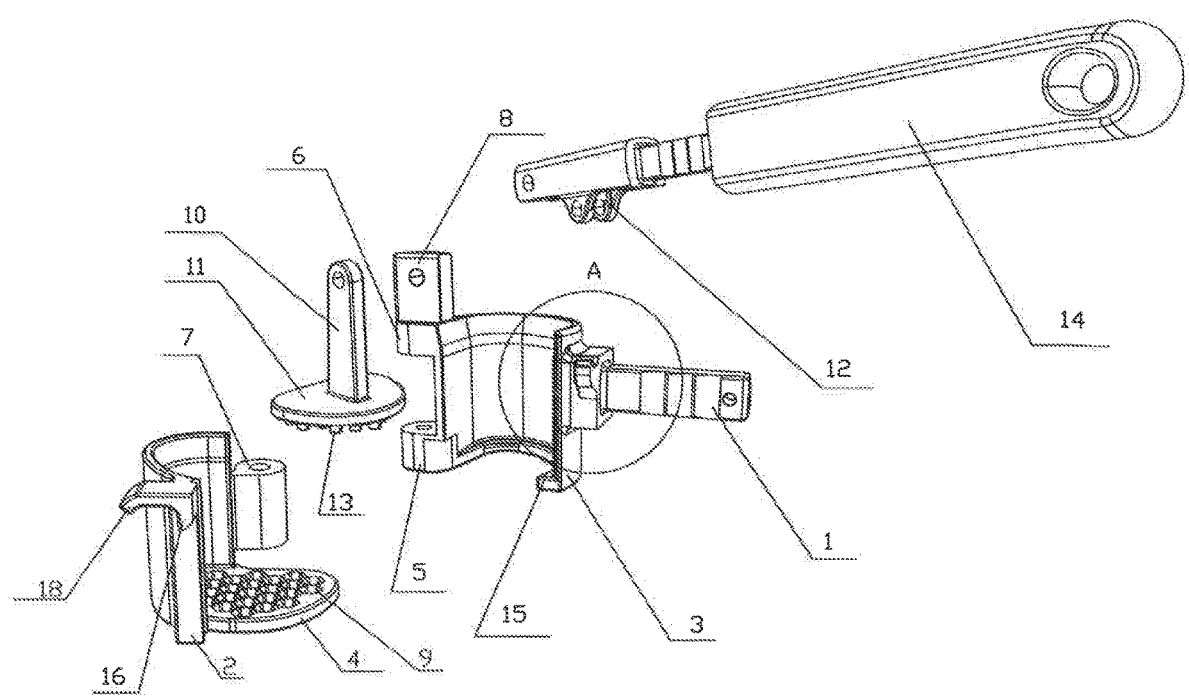
FIG. 1 is an exploded view of a side-opening garlic press according to a preferred embodiment.

The embodiments of the present invention are further described in detail below with reference to the accompanying drawings and description. The following examples are intended to illustrate the invention, but are not intended to limit the scope of the invention.

As shown in FIG. 1 to FIG. 8 of the drawings, an opening and closing (lateral side-opening) garlic press comprises a cup body, a moving handle 14, a fixed handle 1 and a hanging hammer 11 located at a distal end of a hammer frame 10 that has its proximal end pivotally mounted, through a hammer connection 12, towards a first end of the moving handle 14. The hanging hammer 11 realises a press plate that moves within the cup body, as reflected by the drawings.

The cup body comprises a right half cup body 3, a left half cup body 2 and a cup bottom plate 4.

An outer side wall of a fixed end of the right half cup 3 is provided with vertically corresponding upper shaft seat 6 and a lower shaft seat 5. An outer side wall of the fixed end of the left half cup body 2 is provided with a rotating shaft frame 7 which, when assembled, locates and is held between the upper shaft seat 6 and the lower shaft seat 5.

Figure 4:
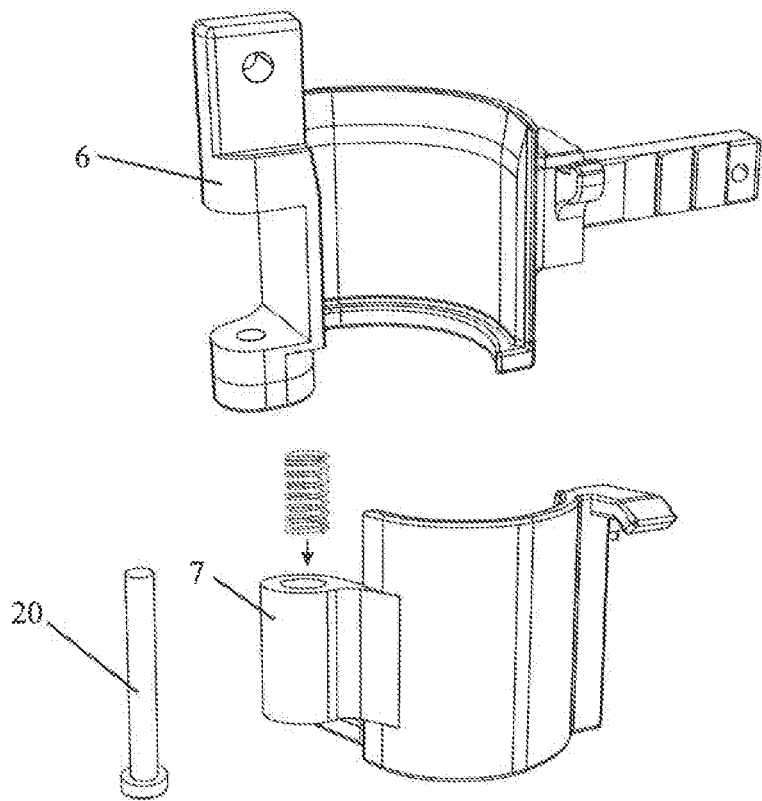
FIG. 4 is an exploded view of the cup body of FIG. 3, including an indication of location of an internal column spring.
Figure 5:
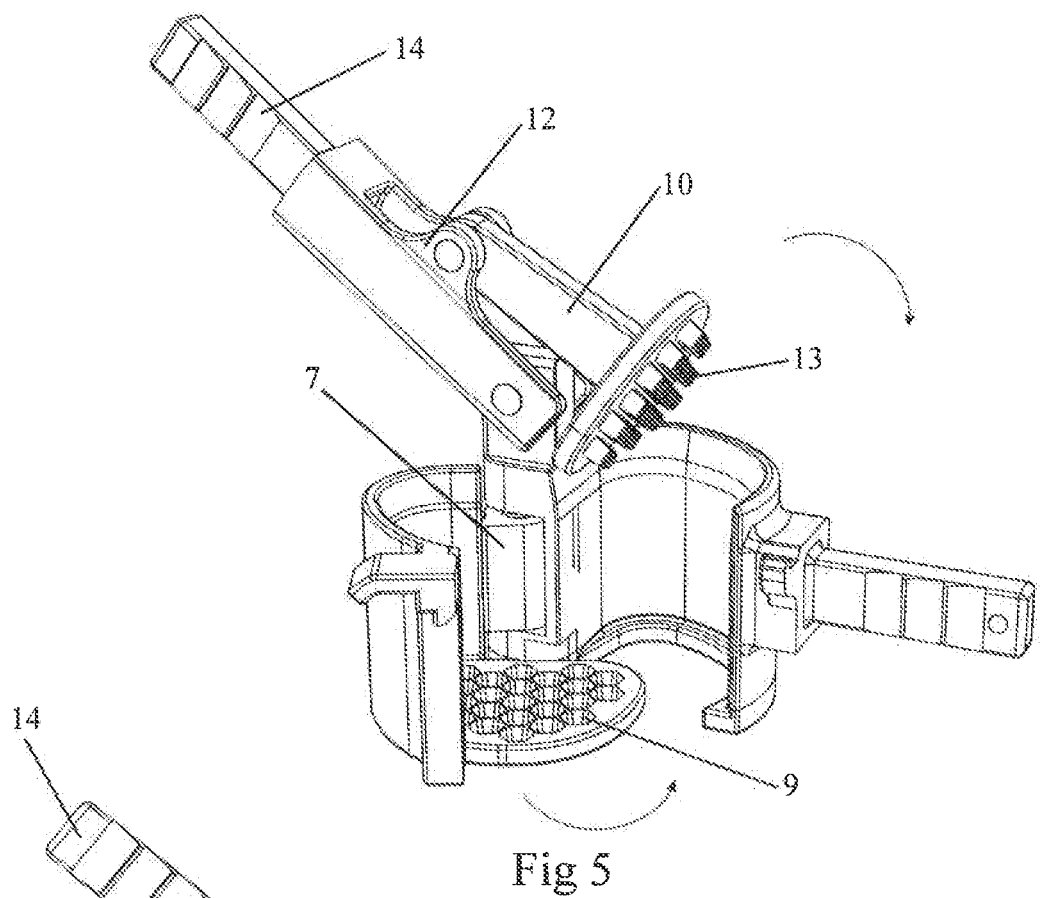
FIG. 5 is a view of the garlic press of FIG. 1 in which the cup body is open and a hanging hammer positioned above the open cup body.
Figure 6:
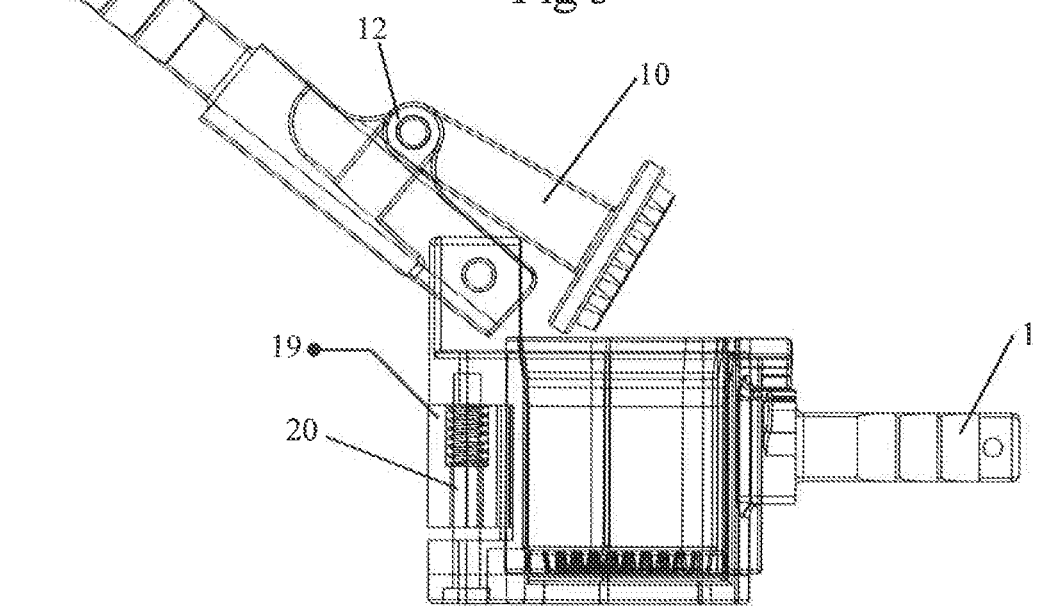
FIG. 6 is a cut-away partial side view of the garlic press of FIG. 3 in which left and right cup body halves are closed together.
Figure 7:
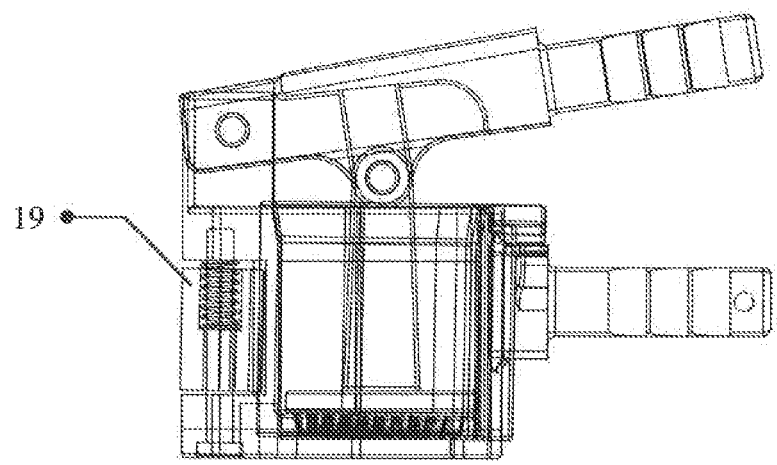
FIG. 7 is a cut-away partial side view of the garlic press of FIG. 3 the cup body is closed and a hammer seat of the hanging hammer pressed to engage a cup bottom plate.
Figure 8:
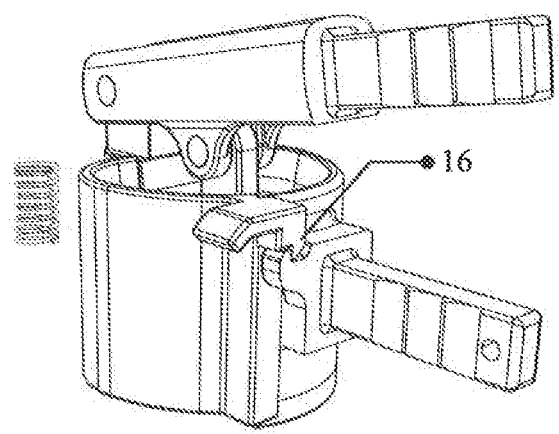
FIG. 8 is a perspective view of the cup in which left and right cup halves are locked together by positively engagement of a latch into a hook.

The assembly of the rotating shaft frame 7, the upper shaft seat 6 and the lower shaft seat 5 is held together, i.e. connected together, via a shaft (shown as a pin 20 in FIGS. 4, 6 and 7).

Optionally, a spring 19 may be placed within the vertically-orientated shaft frame 7 to bias the vertical shaft frame 7 relative to the upper shaft seat 6.

Figure 2:
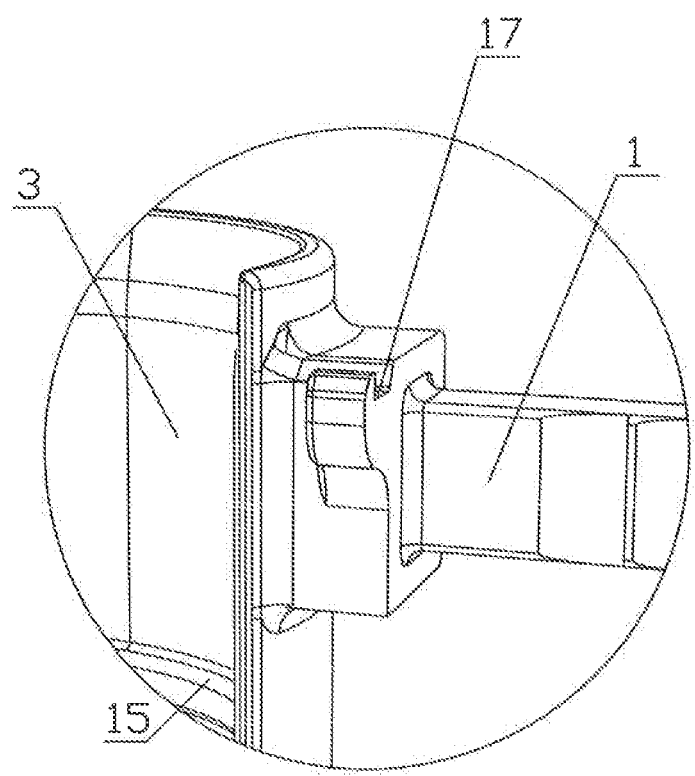
FIG. 2 is an enlarged schematic view of a portion A of FIG. 1.
Figure 3:
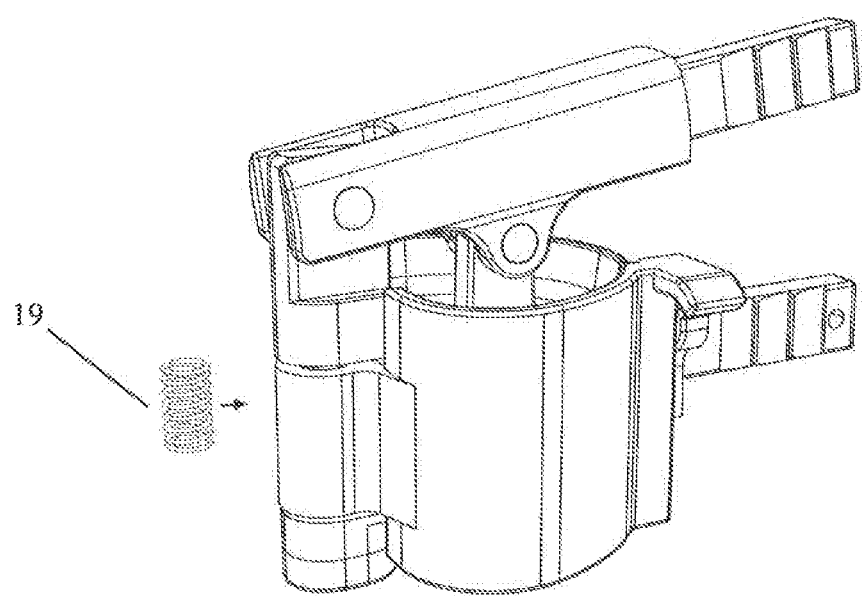
FIG. 3 is a view of the garlic press of an alternative preferred embodiment showing a cup body thereof.

As shown in FIG. 2, an active end of the right half cup body 3 is provided with a recess slot 17. The recess slot 17 act as a latch, with the recess slot (or groove) 17 formed towards a juncture between the right half cup body 3 where it connects to the fixed handle 1.

An upper end/edge of the left half cup body 2 is provided with a block 16 which functions as a latch member that, in use, engages into the recess slot 17 to secure the left half cup body 2 to the right half cup body 3, thereby forming the cup body. In other words, the movable end of the right half cup body 3 and the end of the left half cup body 2 are connected by cooperation of the recess slot 17 and the block 16 and particularly by the retention of the block 16 in the recess slot 17. The combination of the resulting latching mechanism, formed by cooperation of the block (which may include a hook or other catch) with the recess slot 17 (channel or dimple) produces a snap-lock of the left half cup body 2 to the right half cup body 3.

The block 16 is connected to a lift handle 18 that facilitates opening and closing of left half cup body 2 to the right half cup body 3 and, particularly, allows the block 16 to be lifted out of held connection with, i.e. disengaged from, the recess slot 17 to open the garlic press.

An inner wall at a lower end of the right half-cup body 3 is provided with a supporting frame or bracket 15 (shown as a ledge in FIG. 1) that extends around at least part of the inner lower end of the right half cup body 3.

In operation, the left half cup body 2 is raised vertically towards the upper shaft seat 6 to permit the cup bottom plate 4 to clear the bracket 15 and for the block 16 to pass over the upwardly extending and sideways projecting hook, whereafter secure closing of the left half cup body 2 to the right half cup body 3 occurs with snap connection of the block 16 as it drops and is retained from lateral movement by the hook. The vertical displacement of the left side relative to the right side is part of an improved locking process. Firstly, the lifting action ensures that there is sufficient clearance for the cutting cup bottom plate to clear the bracket. Secondly, the lifting action allows the block 16 to clear the upwardly facing hook. Once it is clear, then the left cup side can be dropped to allow the block to engage into the groove 17 and to be locked in place by a hook. These features allow for the cutting base, i.e. the cup bottom plate, to be loose fitting and for there to be no real closure pressure applied laterally across the plate.

When the left half cup body 2 and right half cup body 3 are closed together, one end of the cup bottom plate 4 and the supporting frame 15 overlap such that the supporting frame 15 supports the cup bottom plate 4. As shown in FIG. 1, the other end of the cup bottom plate 4 is fixedly coupled to the bottom end/edge of the inner wall of the left half cup body 2.

The cup bottom plate 4 is provided with a multiplicity of garlic holes 9.

Preferably, the upper end of each garlic hole 9 has a larger aperture than the lower end aperture. The upper end of each garlic hole 9 preferably has a hexagonal (or prism) shape, whereas the lower end is cylindrical. The garlic hole 9 may be a conically-shaped hole and therefore resemble a funnel.

Preferably, the cup bottom plate 4 has a pitch between the garlic holes 9 of about 3 mm. A sharp cutting edge is formed between adjacent garlic holes 9 to facilitate cutting of a garlic bulb pressed between the hammer 11 and the cup bottom plate 4.

Rather than for a garlic bulb (or the like) to be just pressed into an upper surface of the grating formed by the patterns of holes/apertures 9 in the cup bottom plate 4 and extruded (via the holes/aperture) from an underside of the grating, the sharp cutting edges (defined by inclined knife-like lands or ridge regions between at least some of the garlic holes 9) act to cut and dice (rather than crush into the grating and extrude) the garlic bulb thereby preserving most of the bulb's juice. Crushing, on the other hand, has the effect of seeing the garlic juice squirt or shoot in an uncontrolled manner in directions not necessarily corresponding to the direction of travel of the extrudate. The present invention therefore preserves juice by reducing splatter upon processing of the garlic bulb.

The fixed end of the right half cup body 3 is provided with a pin seat 8 that extends above an upper peripheral edge of the right half cup body 3. The moving handle 14 is connected to the pin seat 8 by a pin, with this connection beyond (in the sense of it being closer to the end of the moving handle 14) the hanging hammer connection frame 12, as shown in the drawings.

The hammer is connected with the connecting frame 12 of the moving handle 14 through a pin that allows swinging movement of the hammer (and particularly the hammer frame/post 10) relative to the moving handle. During operation of the garlic press/kitchen implement, the moving handle 14 is lifted up or down pivoting around the pin seat 8, thereby allowing the hammer 11 also to move up or down within the cup body (by virtue of the hammer post's free movement relative to connecting frame 12 (on an underside of moving handle 14).

A lower surface of the hammer seat 11 is provided with teeth 13. These teeth 13 align with and fit within the garlic holes 9. The teeth, in combination with the holes and cutting edges, facilitate cutting (and some pressing) of the garlic bulb.

As shown, one end of the fixed handle 1 is fixedly connected with the right half cup body 3. In operation, a user's first hand can operate the lift handle 18 to engage positively, i.e. lock, the left half cup body 2 into the right hand cup body 3 and that same hand can then be used to move the moving handle 14 and hammer into and out of the cup body so formed. The operator's other hand holds the fixed handle 1. This arrangement of locking of the halves makes operation easier, whilst the supporting frame 15 (which is a functional ledge) provides strength to the tool.

During use, when preparing ("pressing") a garlic bulb, the lift handle 18 is held, and the left half cup 2 and the movable end of the right half cup 3 are combined to make the recess slot/groove 17 and complementary-shaped block 16 engage into each other.

The bracket 15 overlap the lower end faces of the corresponding cup bottom plate 4, and the left half cup body 2, the right half cup body 3 and the cup bottom plate 4 constitute a complete cup body.

With lifting the hand-held end of the moving handle 14 upwardly, the moving handle 14 is rotated about the corresponding pin of the pin shaft seat 8 to lift the hanging hammer. Placing the garlic bulb into the cup body and pressing down the hand-held end of the moving handle 14 causes the hammer to move downwards to act on (and apply some level of appropriate force to) the surface of the garlic bulb. This downward movement and force cuts the garlic bulb on its side adjacent the garlic holes 9 (of the bottom plate 4).

For cleaning, the lift handle 18 is held and generally pushed upwards, so that the block 16 is separated and released from engagement within the recess slot 17, thereby allowing the left half cup body 2 to be rotated around the rotating vertical shaft and thereafter to fully expose the inside surfaces of the two cup body halves and the cup bottom plate. The configuration therefore allows the inner cavity of the cup of the garlic press to be more thoroughly cleaned.

It should be noted that the above embodiments are only used to illustrate the technical solutions of the present invention, and are not limited thereto; although the present invention has been described in detail with reference to the foregoing embodiments, those skilled in the art should understand that The technical solutions described in the foregoing embodiments may be modified, or some of the technical features may be equivalently substituted; and the modifications or substitutions do not deviate from the scope of the technical solutions of the embodiments of the present invention. For example, the orientation of "left" and "right" is illustrative since it is evident that an alternatively-handed construction is equally possible.

Whilst the embodiments of the figures have been described in the context of a garlic press, the invention is applicable to other handheld kitchen presses designed to squeeze and/or crush fruit and/or vegetables, especially foodstuffs having a relatively hard composition or texture.

What is claimed is:

1. An opening and closing handheld kitchen press tool comprising:
   a cup body formed from a right half cup body hingedly coupled to a left half cup body, wherein each of the right half cup body and the left half cup body has an inner surface and an outer sidewall, and
   the left cup body includes:
      at a hinge side thereof, a vertical shaft,
      along a lower edge of the inner surface, a cup bottom plate laterally extending from the lower edge, wherein the cup bottom plate includes a plurality of extrusion apertures, and
      a latch in the form of a lift handle and block, wherein the latch is coupled to the outer sidewall at an open side of the left cup body in an upper corner,
   the right half cup body includes a laterally-extending bracket extending from a lower edge thereof and, from a hinge side and extending from the outer sidewall, a lower shaft seat correspondingly vertically aligned with an upper shaft seat,
   a fixed handle having first and second ends, the first end connected to the outer sidewall of the right half cup body opposite the vertical shaft, the fixed handle including an upwardly extending and sideways projecting hook at the first end,
   a pin shaft seat coupled above the upper shaft seat of the right half cup body,
   a moveable handle connected into the pin shaft seat to allow the moveable handle to be raised and lowered relative to the fixed handle, and
   a hanging hammer extending below the moveable handle on a hammer frame that is pivotally coupled to the moveable handle at a hammer connection, the hanging hammer further including a hammer seat located at a remote end of the hammer frame, wherein pivoting coupling of the hammer frame to the moveable handle allows the hammer seat to drop vertically within the cup body when the cup body is formed from closure together of the left half cup body against the right half cup body, and
   to form the cup body:
      a pin holds the vertical shaft in place between the lower shaft seat and the upper shaft seat and allows rotation of the vertical shaft and the cup bottom plate about the pin and the vertical shaft is vertically moveable between the lower shaft seat and the upper shaft seat along the pin, and
      when the kitchen press tool is in the closed position, the cup bottom plate rests against the bracket to overlap the bracket thereby to provide a floor that extends generally between the inner surfaces of the hingedly closed right half cup body and left half cup body, and
      closing of the kitchen press tool requires, initially, the left half cup body to be raised vertically towards the upper shaft seat to permit the cup bottom plate to clear the bracket and for the block to pass over the upwardly extending and sideways projecting hook, whereafter secure closing of the left half cup body to the right half cup body occurs with snap connection of the block as it drops and is retained from lateral movement by the hook.

2. The opening and closing press tool according to claim 1, wherein upper end apertures, of the plurality of extrusion apertures, in an upper surface of the cup bottom plate are larger than lower end apertures in a bottom surface of the cup bottom plate.

3. The opening and closing press tool according to claim 1, wherein an under surface of the hammer is provided with a plurality of protruding teeth adapted to locate into the apertures in the cup bottom plate.

4. The opening and closing press tool according to claim 3, wherein the upper end apertures are of a hexagonal prism shape and the lower end apertures are of a cylindrical shape.

5. The opening and closing press tool according to claim 2, wherein a distance between the upper end apertures is about 3 mm.

6. The opening and closing press tool according to claim 2, wherein each of the extrusion apertures is a conical hole.

7. The opening and closing press tool according to claim 1, wherein the vertical shaft includes a spring to bias the vertical shaft relative to the upper shaft seat.

8. The opening and closing press tool according to claim 1, wherein cutting surfaces or cutting edges are formed between at least some of the extrusion apertures.

9. The opening and closing press tool according to claim 2, wherein an under surface of the hammer is provided with a plurality of protruding teeth adapted to locate into the extrusion apertures in the cup bottom plate.

10. The opening and closing press tool according to claim 3, wherein each of the extrusion apertures is a conical hole.

11. The opening and closing press tool according to claim 4, wherein each of the extrusion apertures is a conical hole.

12. The opening and closing press tool according to claim 5, wherein each of the extrusion apertures is a conical hole.

13. The opening and closing press tool according to claim 2, wherein the vertical shaft includes a spring to bias the vertical shaft relative to the upper shaft seat.

14. An opening and closing garlic press comprises a cup body, a movable handle and a hanging hammer, wherein the cup body comprises a right half cup body, a left half cup body and a cup bottom plate, an outer side wall of a fixed end of the right half cup body is provided with a vertically corresponding upper shaft seat and a lower shaft seat, and a fixed end outer side wall of the left half cup body is provided with a rotating shaft, the rotating shaft, the upper shaft seat and the lower shaft seat are connected by a pin, the rotating shaft is vertically moveable between the lower shaft seat and the upper shaft seat along the pin; an upper end of a movable end of the right half cup body is connected by a snap connection with an upper end of a movable end of the left half cup body; a lower end of an inner wall of the right half cup body is provided with a bracket, and one end of the cup bottom plate and the bracket is overlapped, and the other end of the cup bottom plate is fixedly connected with a bottom end of an inner wall of the left half cup body, and the cup bottom plate is provided with garlic holes; an upper end of the fixed end of the right half cup body is provided with a pin seat, and the movable handle is connected with the pin seat through a pin; the movable handle provided with a hammer connecting frame, a hanging hammer comprises a hammer frame and a hammer seat, and the hammer frame and the hammer connecting frame are connected by a pin shaft.

15. The opening and closing garlic press according to claim 14, further comprising a fixed handle, one end of the fixed handle being fixedly connected to the movable end of the right half cup body.

16. The opening and closing garlic press according to claim 14, wherein an upper end aperture of the garlic hole is larger than a lower end aperture of the garlic hole.

17. The opening and closing garlic press according to claim 16, wherein a lower end surface of the hammer seat is provided with protruding teeth, and an upper end of the garlic hole is adapted to receive the protruding tooth.

18. The opening and closing garlic press according to claim 17, wherein the upper end aperture of the garlic hole has a hexagonal prism shape and the lower end aperture is cylindrical.

19. The opening and closing garlic press according to claim 18, wherein the garlic holes comprise a plurality of upper end apertures, and a distance between the upper end apertures is about 3 mm.

20. The opening and closing garlic press according to claim 17, wherein the garlic hole is a conical hole.

\* \* \* \* \*